(12) United States Patent
Kornev et al.

(10) Patent No.: US 8,745,518 B2
(45) Date of Patent: Jun. 3, 2014

(54) TOUCH SCREEN INPUT RECOGNITION AND CHARACTER SELECTION

(75) Inventors: Alexey Kornev, St. Petersburg (RU); Alexey Zavitaev, St. Petersburg (RU); Kristina Kudrjavceva, St. Petersburg (RU)

(73) Assignee: Oracle America, Inc., Redwood City, CA (US)

( * ) Notice: Subject to any disclaimer, the term of this patent is extended or adjusted under 35 U.S.C. 154(b) by 830 days.

(21) Appl. No.: 12/494,745

(22) Filed: Jun. 30, 2009

(65) Prior Publication Data

US 2010/0333011 A1 Dec. 30, 2010

(51) Int. Cl.
*G06F 3/14* (2006.01)

(52) U.S. Cl.
USPC ........... 715/773; 715/200; 715/700; 704/270; 345/157; 345/168; 345/173; 345/473

(58) Field of Classification Search
USPC ............ 715/200–277, 700–867; 345/30–111, 345/173, 473; 700/701–866; 709/201–229; 705/50–79
See application file for complete search history.

(56) References Cited

U.S. PATENT DOCUMENTS

| | | | | |
|---|---|---|---|---|
| 6,169,538 B1* | 1/2001 | Nowlan et al. | ................ | 345/168 |
| 7,215,323 B2* | 5/2007 | Gombert et al. | ............. | 345/157 |
| 7,490,041 B2* | 2/2009 | Davis | ............................ | 704/270 |
| 2007/0040813 A1* | 2/2007 | Kushler et al. | ................ | 345/173 |
| 2010/0123724 A1* | 5/2010 | Moore et al. | .................. | 345/473 |

* cited by examiner

*Primary Examiner* — Ruay Ho
(74) *Attorney, Agent, or Firm* — Polsinelli PC

(57) ABSTRACT

A system and method of character input using a virtual keyboard, which may have a reduced number of keys. The virtual keyboard may be displayed on a touch screen and may include a plurality of keys. The virtual keyboard may have a plurality of keys, each key having a number of characters or symbols. Characters associated with a particular key may be selected through a series of related touch screen inputs.

18 Claims, 10 Drawing Sheets

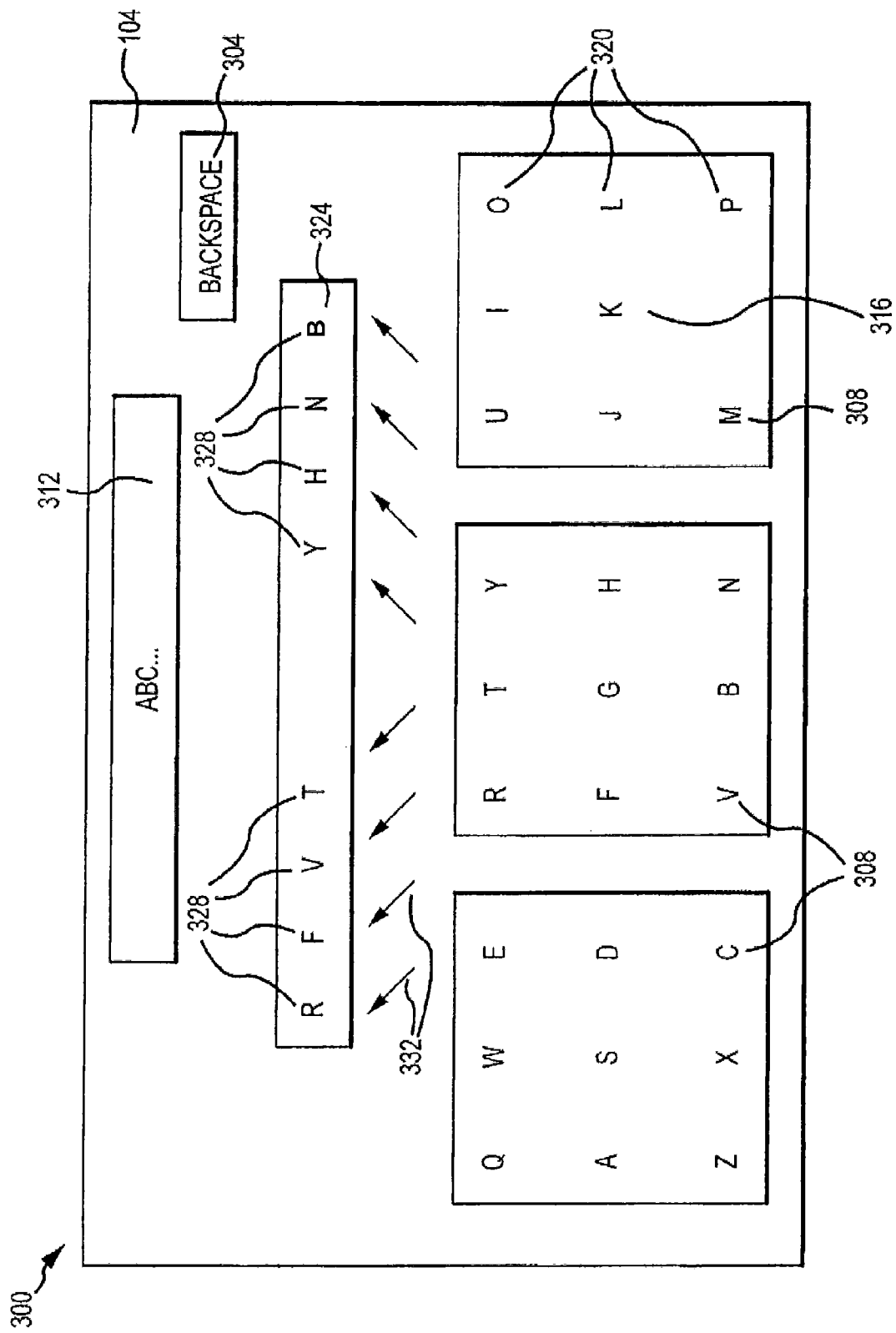

TOUCH SCREEN INPUT RECOGNITION AND CHARACTER SELECTION

TECHNICAL FIELD

Implementations discussed herein are directed to receiving and processing inputs on a touch screen device, and more particularly to receiving and processing inputs that select a character on a virtual key that has more than one character.

BACKGROUND

Mobile devices may have a limited character input capability due to their size. Such devices may be equipped with a touch screen for entering characters through a display such as a virtual keyboard. A virtual keyboard may be represented as an image displayed on the screen of a mobile device. To enter a character a user may press a pictured key with the character he wants to input. In some devices, a stylus is used for this purpose. However, in many of today's device the keyboard and, in fact, the whole device may be controlled by a finger or thumb.

In some cases, due to their size, it not practical for certain mobile devices to display a standard keyboard having keys of a usable size. With this in mind, some mobile devices may display a virtual keypad with a layout similar to that of standard phone. Specifically, the mobile device may display a keyboard having a limited number of keys and assign one key to a number different characters. To select a particular character, a user may press a key several times until the right character is displayed or in some instances the device may be programmed to predict words as the user presses keys.

SUMMARY

Implementations discussed herein are directed to a system and method of character input using a virtual keyboard, which may have a reduced number of keys. The virtual keyboard may be displayed on a touch screen and may include a plurality of keys. The virtual keyboard may have a plurality of keys, each key having a number of characters or symbols. Embodiments discussed herein are directed to selecting various characters associated with a particular key through a series of touch screen inputs.

One embodiment is directed to an electronic device having a touch screen and device driver controlling the touch screen, the device driver running on a processor, a method for receiving user input, comprising: receiving, through the touch screen, a first touch screen input corresponding to a first touch position, the first touch position corresponding to a virtual key, the virtual key having a primary key character and a plurality of secondary key characters; displaying, by the device driver, a character menu on the touch screen, the character menu having a plurality of menu characters corresponding to the secondary key characters of the virtual key; receiving, through the touch screen, a second touch screen input corresponding to a second touch position on the touch screen; displaying, by the device driver, a character on the touch screen based on the second touch position.

Another embodiment is directed to an electronic device, comprising: a processor in communication with at least one memory for storing computer executable code; a device driver stored in the memory and executing on the processor; a touch screen under the control of the device driver, the touch screen operable to receive a first touch screen input corresponding to a first touch screen location and a second touch screen input corresponding to a second touch screen location; at least one virtual key displayed on the touch screen, the virtual key having a primary key character and a plurality of secondary key characters; a character menu displayed on the touch screen, the character menu having a plurality of menu characters corresponding to the secondary key characters of the virtual key; an output window displayed on the touch screen and operable to display a character based on the second touch screen location.

BRIEF DESCRIPTION OF THE DRAWINGS

FIG. 3 is an illustration of another touch screen display for the device shown in FIG. 1;

DETAILED DESCRIPTION

Implementations discussed herein are directed to a system and method of character input using a virtual keyboard, which may have a reduced number of keys. The virtual keyboard may be displayed on a touch screen and may include a plurality of keys. Each key represents a number of characters and/or symbols. Embodiments discussed herein are directed to selecting various characters associated with a particular key by first recognizing the keys selected by the user and then recognizing a direction that the user slides his finger where the direction is toward one particular character symbol represented by the key.

Figure 1:
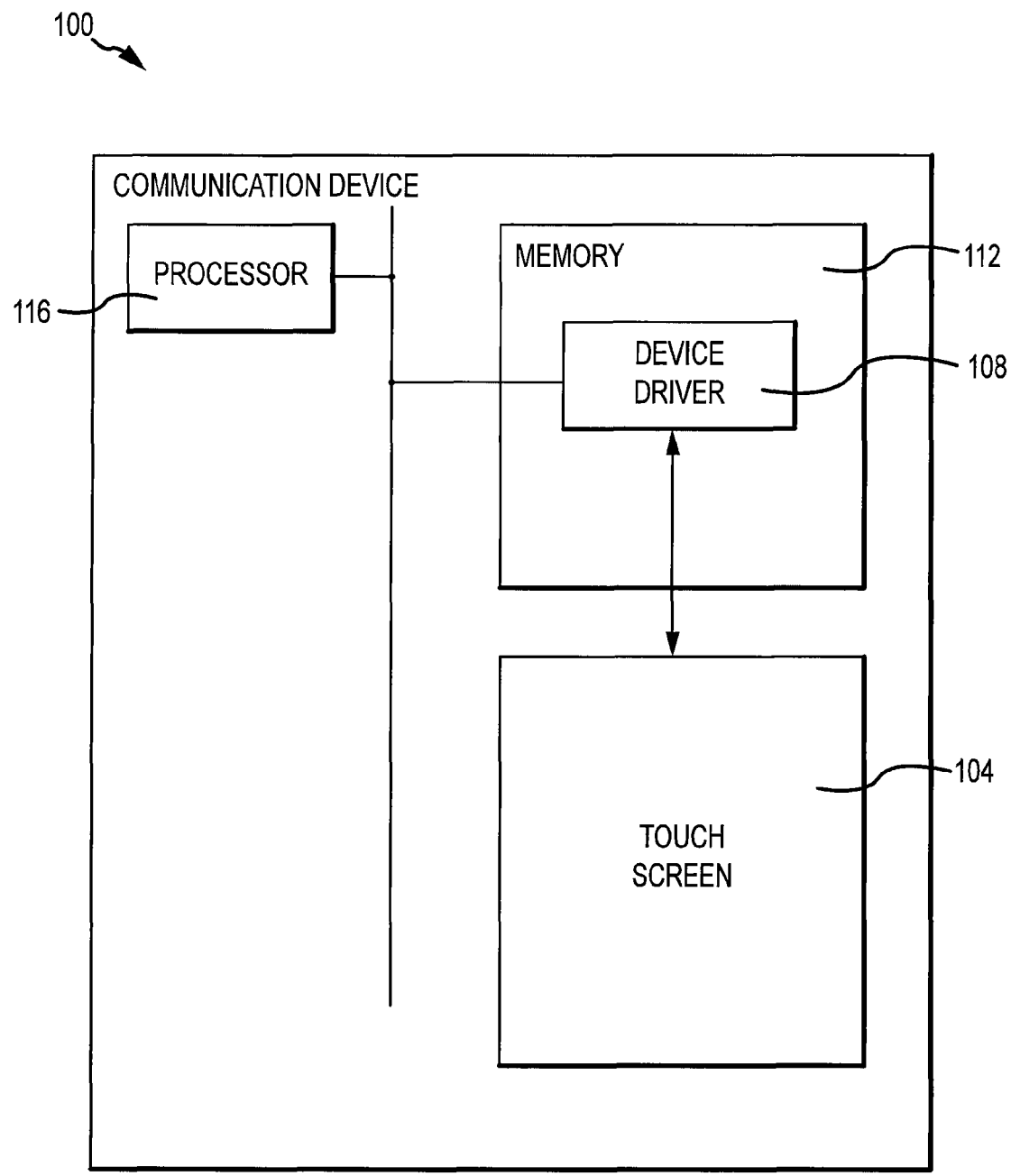
FIG. 1 is a schematic illustration of a device in accordance with implementations discussed herein.

FIG. 1 is a block diagram showing components and features associated with embodiments discussed herein. FIG. 1 is an illustration of a device 100, which includes a touch screen 104. The device 100 may by any one of a number of devices which utilize touch screens such as cellular telephones, radios, global positioning systems, personal data assistants, and so on. Embodiments discussed herein are not necessarily limited to handheld devices and may be used in connection with touch screen devices used with stationary systems such as automatic teller machines (ATM) and/or general purpose computers. The touch screen 104 may be provided in association with a device driver 108 that controls the operation of the touch screen 104. Specifically, the device driver 108 may provide output, such as characters, to be displayed on the touch screen 104. The device driver 108 may also sense touch screen input such as a user pressing or otherwise contacting the surface of the touch screen with a finger or thumb. Specifically, a user may press the touch screen 108 at or near an icon or other character that the user wishes to select.

The device driver 108 may be a computer executable program stored in a memory 112. The memory 112 is a computer readable storage medium that is operable to store applications and/or other computer executable code which runs on the processor 116. The memory 112 may be volatile or non-volatile memory implemented using any suitable technique or technology such as, for example, random access memory (RAM), disk storage, flash memory, solid state and so on. In one possible implementation, the device driver 108 is executed on a processor 116 in communication with the memory 112.

Figure 2A:
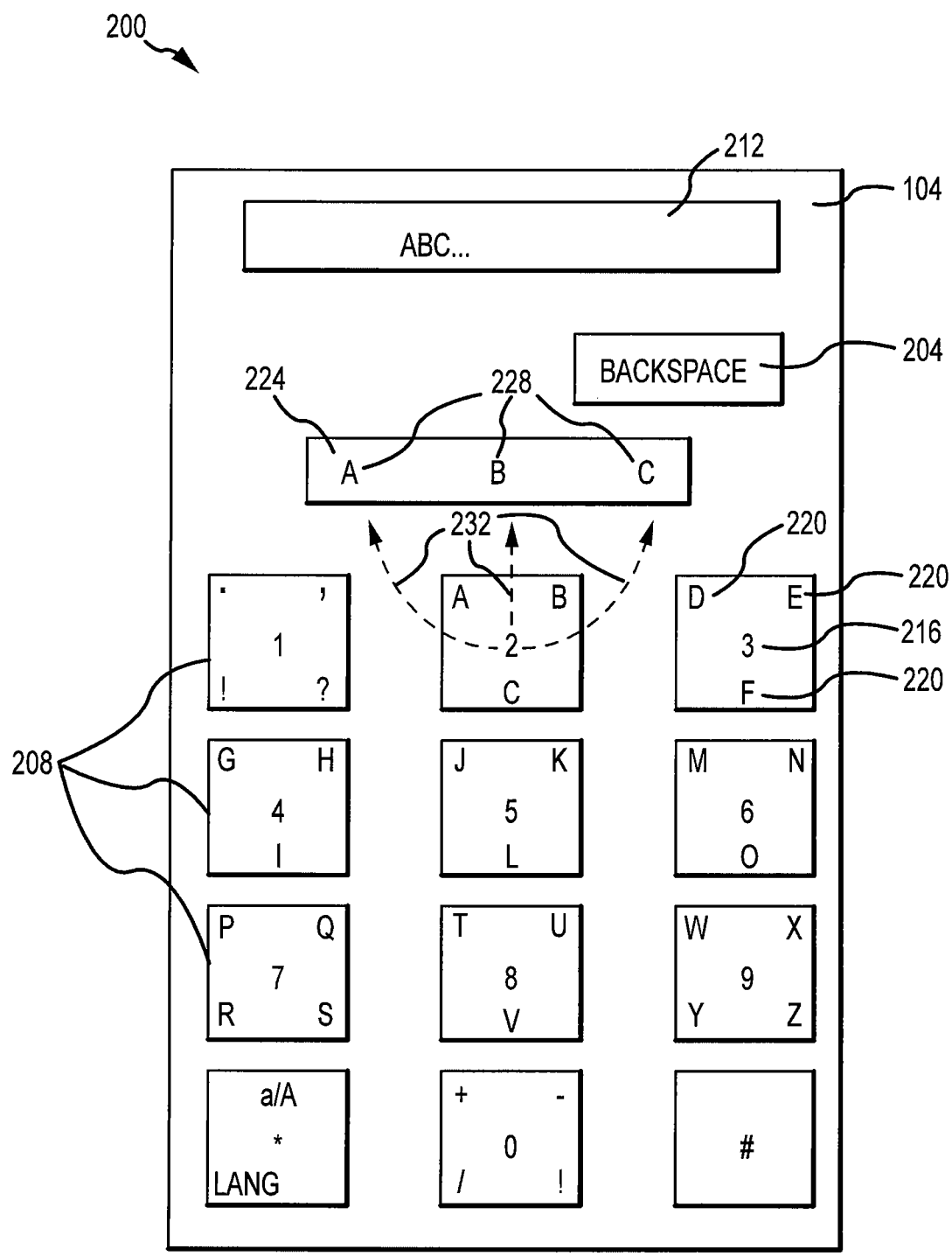
FIG. 2A is an illustration of a touch screen display for the device shown in FIG. 1.

An example of a touch screen display 200 is given in FIG. 2A. FIG. 2A is a schematic illustration of the touch screen 104 that may be associated with a communication device such as a cellular telephone. The touch screen display 200 may include a plurality of keys 208 that are selectable by a user, who selects a particular key by pressing an appropriate location of the touch screen 104. Characters selected by a user through touch screen 104 input may be displayed on the touch screen 104 through an output window 212.

The keys 208 associated with the touch screen display 200 may include a primary key character 216, and a number of secondary key characters 220. The primary key characters 216 may correspond to a default character associated with a particular key 208 and, in one embodiment, may be located at the center of the key. In addition to a primary key character 216, a particular key 208 may include a number of secondary key characters 220, which may be located, in one embodiment, in off-center key locations on the key. In the touch screen display 200 example shown in FIG. 2A, the keys 208 include primary key characters 216 which are numbers. Further, the secondary key characters 220 correspond to the letters of the alphabet and a number of symbols. To select a primary key character 216, a user may press the key 208 and, following that, release the key 208.

In contrast to selecting a primary key, a user may select a secondary key character 220 by executing or performing a two-part touch screen operation. The two-part touch screen operation may include at least two related touch screen inputs. In a first part, a user may press and hold the key 208. Following this, in a second part, a user may slide his thumb or finger away from the location of the original key press toward one of the secondary key characters. The direction or the final destination of this second part of the touch screen operation may indicate a selection or choice of a particular secondary key character 220.

In connection with selecting a particular secondary key character, the touch screen display 200 may include a character menu 224. The character menu 224 may be displayed by the device driver 108 in response to a user pressing and holding a particular key 208. In the example shown in FIG. 2A, the character menu is shown immediately above the keys 208. However, the character menu may be shown in other locations. For example, the device driver 108 may display the character menu 224 in proximity to the key 208 that is pressed by the user. The character menu 224 may display a number of menu characters 228, responsive to the initial selection of a key. Hence, the displayed menu characters 228 correspond to the secondary key characters 220 associated with the key 208 pressed by the user. The character menu may also show the primary key characters. When the character menu 224 is displayed on the touch screen 104 by the device driver 108, a user may select a particular secondary key character 220 by a movement of a thumb or other part along the touch screen 204. In one embodiment, the user may move the thumb or finger towards or on top of a particular secondary menu character 228 displayed in the character menu 224, while maintaining some degree of contact with the touch screen so that the touch screen/device driver are able to detect the direction of movement across the touch screen. The character menu assists the user by highlighting the secondary character selected by the user. FIG. 2A includes a number of slide paths 232 along which a user slides a thumb or finger to indicate a particular secondary key character 220 selection by a movement towards or on top of a particular menu character 224. The direction and/or the final destination of the movement along the particular slide path 232 selects a particular secondary key character 220.

By way of example and not limitation, the character menu 224 is illustrated herein as being a substantially horizontal bar or strip that is displayed above a selected key 208. This particular character menu 224 may be preferable in some embodiments where it is desired to place the character menu 224 in a location that is unobstructed from view by the user's thumb or finger. In other embodiments, the character menu 224 may be displayed in other orientations such as vertical or circular. In certain embodiments, a separate character menu may be omitted. In this case, a user may make a selection of a secondary character based on the location of secondary character on the selected key 208. Here, the selected key 208 may be enlarged and/or oriented such that the secondary characters are in a visible location. Following this, a user may slide a finger in the direction of or on top a secondary character to thereby select the character.

Figure 2B:
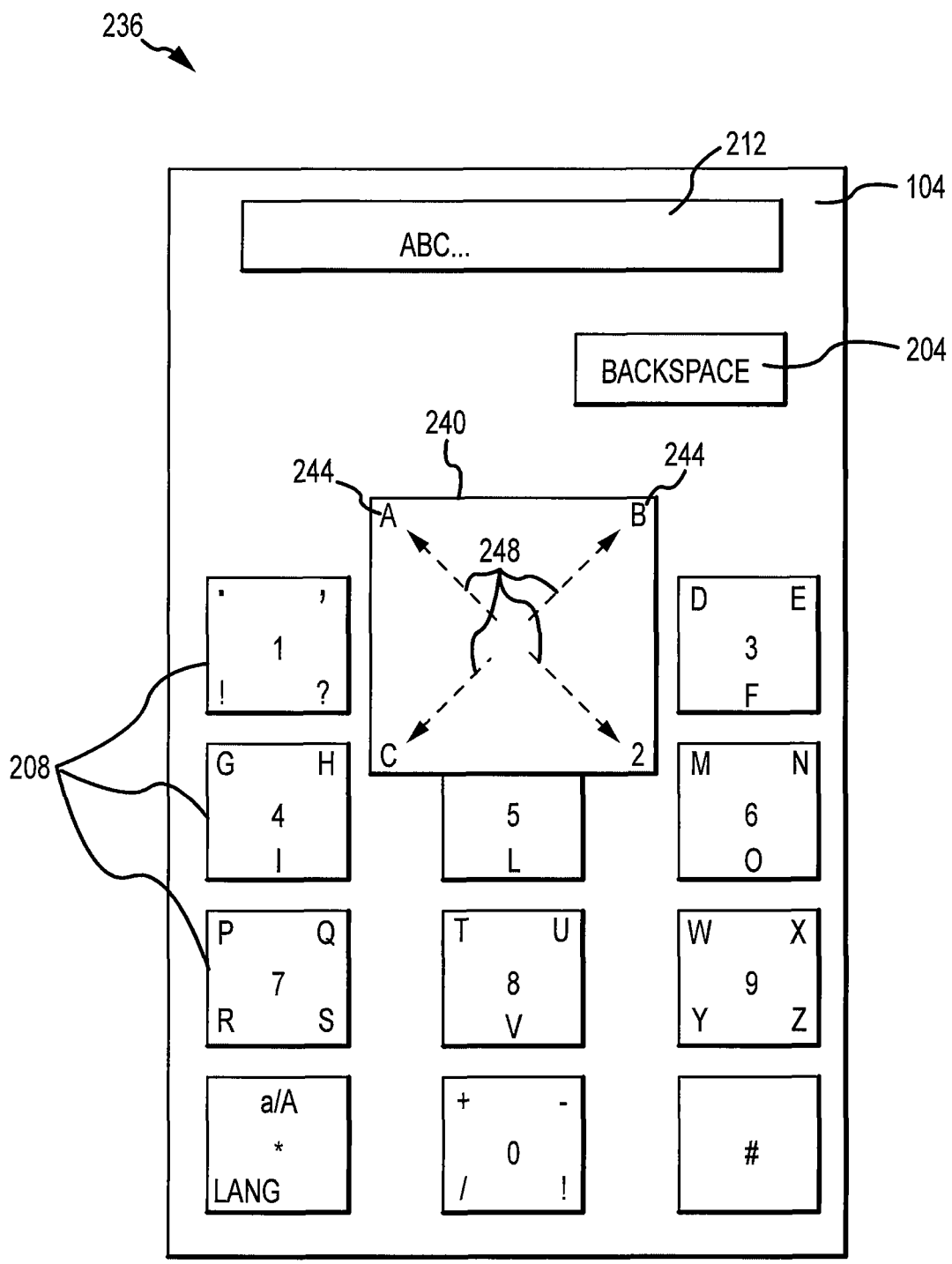
FIG. 2B is an illustration of a touch screen display for the device shown in FIG. 1.

FIG. 2B is an illustration of a touch screen display 236 embodiment, that includes an a character menu 240 that is implemented as an enlarged key. The device driver 108 may display the character menu 240 in response to a first touch screen input. The character menu 240 may be displayed on top of or as a overlay to the key that was pressed by the user. The character menu 240 example shown in FIG. 2B is displayed in response to a user pressing the "2" key. Like the character menu 224 shown in FIG. 2A, the character menu 240 may include a number of secondary characters displayed at various locations, such as for example, at the corners of the menu 224. Characters on the character menu 240 may be selected by movements of a user's thumb or finger along one of the slide paths 248.

In accordance with certain implementations, the keys 208 do not have a primary character or default character. In this embodiment, all the characters associated with a key 208 are displayed on the character menu. An example of this embodiment is shown in FIG. 2B. In FIG. 2B, the character menu 240 includes four menu characters 244, corresponding to the full number of characters on the "2" key. In this embodiment, a user selects all characters on the key in the same manner. Specifically, in a first touch screen operation, the user presses and holds the key 208. In a second touch screen operation, the user then slides his thumb or finger along a particular slide path 248 to select a particular character 244. In this embodiment, touch screen operations that do not include this two-part operation may be considered not to correspond to any character selection. For example, the device driver 108 may not register a character selection if a user presses and releases a key 208 or if a user presses a key 208 and then slides his thumb or finger outside the boundaries of the character menu 240. These touch screen inputs may be interpreted as a mistake or other non-selection by the user.

The touch screen display 200 shown in FIG. 2A is by way of example and not limitation. Other keyboard orientations or displays are considered within the scope of the invention. For example, other touch screen keyboards may include different numbers of keys, different sizes of keys, and/or different numbers of secondary key characters. FIG. 3 is an illustration of another touch screen display 300 embodiment. The touch screen display 300 shown in FIG. 3 includes three enlarged keys 308, each key having one primary key character 316 and eight secondary key characters 320. The three keys 308 shown in FIG. 3 implement the full 26-character Roman alphabet. The characters of the Roman alphabet are organized on the three enlarged keys 308 in the familiar QWERTY keyboard pattern. The touch screen display 300 shown in FIG. 3 includes an output window 312 which may be operable to display characters selected by user input. The touch screen display 304 shown in FIG. 3 may additionally include a character menu 324 displaying a number of menu characters 328 corresponding to the secondary key characters 320 of a particular key 308. Following a user input of pressing and holding a particular key 308, the user may slide his or her thumb or finger along the touch screen 104 to thereby indicate one of the menu characters 328 on the character menu 324 to thereby choose one of the secondary key characters 320 associated with the particular key 308.

Figure 4:
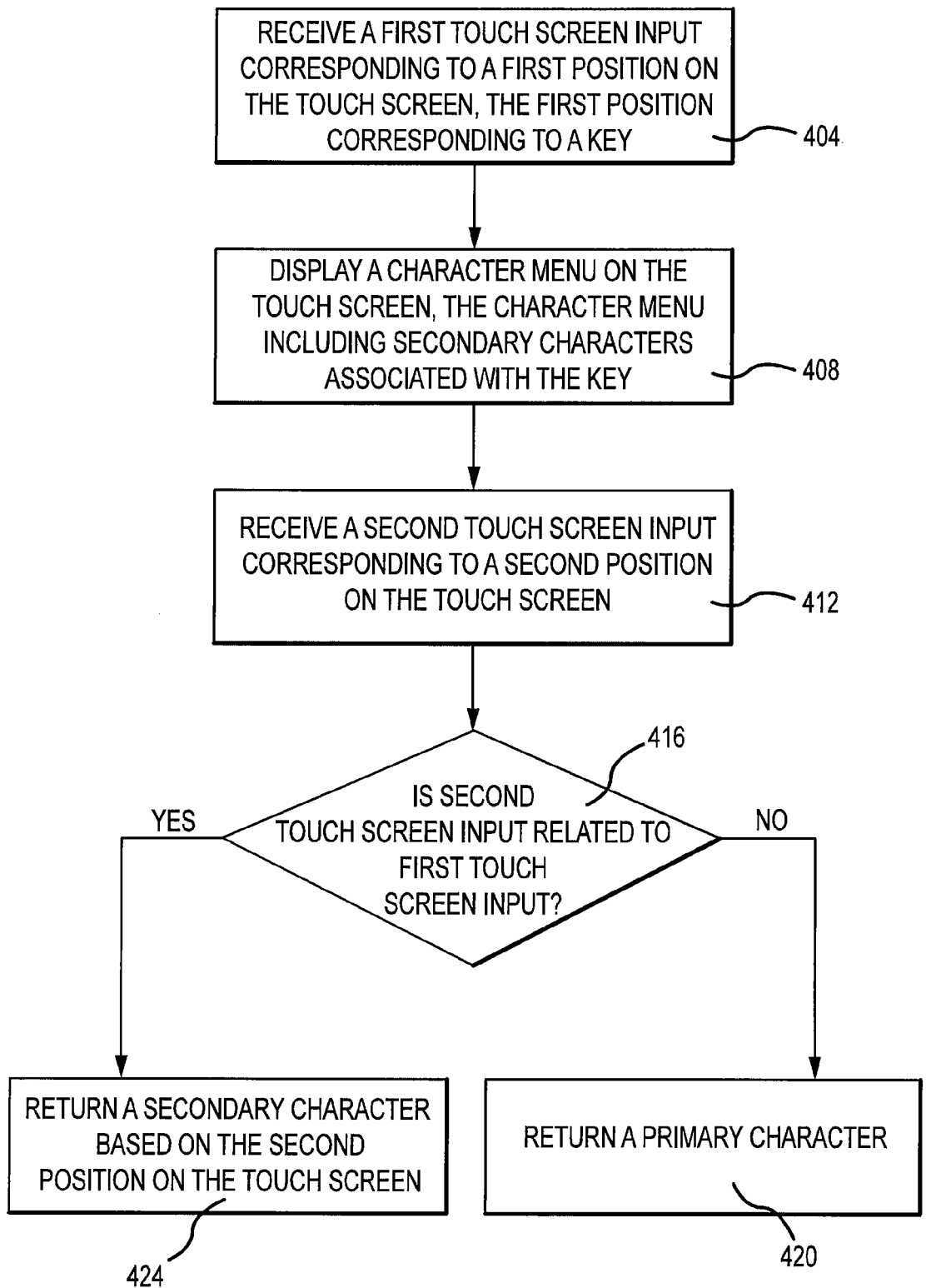
FIG. 4 is a flow chart illustrating operations in a method in accordance with implementations discussed herein.

FIG. 4 is a flow chart 400 illustrating a method in accordance with embodiments discussed herein. The method illustrated in FIG. 4 includes operations associated with a device driver 108 that controls or otherwise operates a touch screen 104. The device driver 108 is operable to receive one or more inputs, and in response to receiving the inputs return a particular character. In returning a particular character, the device driver 108 may display the character in an output window 212 on a touch screen 104.

Initially, at operation 404, the device driver 108 receives a first touch screen input. The first touch screen input may correspond to a first touch position on the touch screen. Specifically, a user may cause the touch screen 104 input, by placing a thumb or finger in contact with the touch screen 104 thereby specifying or selecting a particular portion of the touch screen 104 surface. The selected portion of the touch screen 104 may correspond to a particular key 208 of a displayed key pad or keyboard. In receiving the first touch screen input the device driver 108 registers that the user has selected a particular key. Following operation 404, operation 408 may be executed.

In operation 408, the device driver displays a character menu 224 on the touch screen 104. The character menu 224 may be displayed on the touch screen 104 after the user has held the key 208 for a sufficient amount of time. The time may be programmed to a user preference or may be programmed at 0.5 sec, for example. If it is the case that the user selects and releases the key 208, a character menu is not be displayed. Specifically, in this case, the character returned by the device driver 108 corresponds to the primary key character. If, however, the key 208 is pressed and held for the specified time, the device driver displays the character menu 224. In some implementations, the touch screen 104 may not include the character menu 224, or the user may have the option to disable the menu. The character menu 224 displays the secondary key characters 220 associated with the selected key 208. Following operation 408, operation 412 may be executed. In operation 412, the device driver 108 receives a second touch screen input. The second touch screen input may correspond to a second position on the touch screen 104. Following operation 412, operation 416 may be executed.

In operation 416, the device driver determines whether the second touch screen input is related to the first touch screen input. The device driver 108 may determine that the second touch screen input is related or associated with the first touch screen input if the user slides, glides or otherwise moves his thumb or finger along the touch screen 104 from the first touch position to the second touch position. Provided certain conditions are met, the device driver 108 registers this sliding movement as indicative of a choice of a particular secondary key character 216. If, in operation 416, it is determined that the second touch screen input is unrelated to the first touch screen input, then operation 420 may be executed.

In operation 420, the device driver 108 may register that at least a selection of the primary key character 216 is indicated by the user input. Specifically, the first and second touch screen 104 inputs being unrelated may be indicative of a user pressing a first touch screen 104 location, releasing the first touch screen 104 location and pressing a second touch screen 104 location corresponding to, for example, a secondary or other key on the virtual keypad or keyboard. If, in operation 416, it is determined that the second touch screen input is related to the first touch screen input, then operation 424 is executed.

In operation 424, the device driver 108 returns a character based on the second touch position associated with the second touch screen 104 input. The direction and/or final destination of the second touch screen 104 input indicate a user selection of a particular secondary menu character displayed on the character menu. Selecting the menu character 228 may thereby indicate a selection of a particular secondary key character 220.

FIG. 5 through FIG. 10 are close-up illustrations of a particular key 208 associated with the touch screen display 200. FIG. 5 through FIG. 10 further illustrate concepts and/or methods used herein in connection with selecting a particular secondary key character 220. In some embodiments, a selection of a particular secondary character may be indicated by a touch screen operation that includes placing a finger on a location that corresponds to the location of character displayed on a character menu. In other embodiments, a selection of a particular secondary character is indicated by the direction of particular touch screen operation. A touch screen input direction that is towards a character on a character menu may indicate a selection of the character. Also, a touch screen input that is directed away from in a first touch screen input location at a certain angle may indicate the selection of a particular character.

Figure 5:
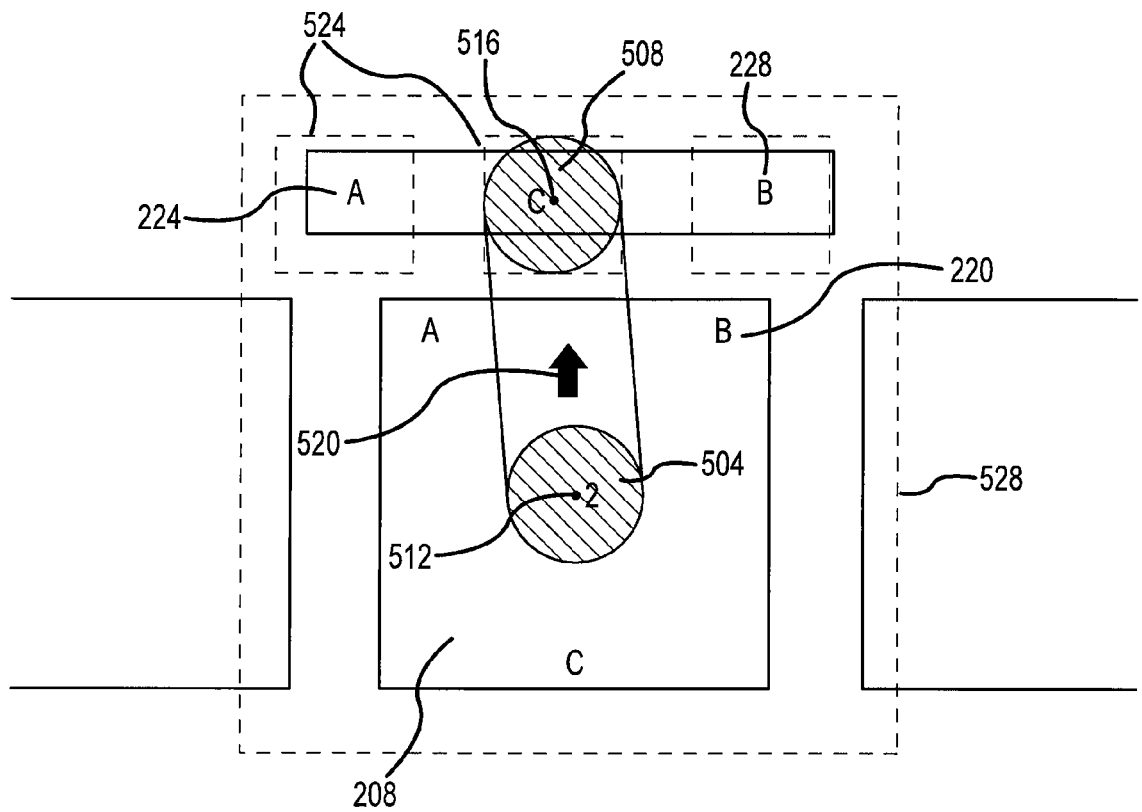
FIG. 5 is an illustration of a portion of the touch screen display shown in FIG. 2A that shows a key touch screen operation.

FIG. 5 illustrates a selection of a secondary key character 220, specifically the "C" character. FIG. 5 shows a slide path 520 that begins with a first touch area 504 and ends with a second touch area 508. When a user places his thumb in contact with the touch screen 104, a touch screen 104 input may register as a plurality of points on the touch screen 104 surface. As used herein, "touch area" corresponds to those points on the touch screen 104 which register a touch from a user's thumb or finger. For purposes of illustration, the "touch areas" are shown as cross-hatched circles. The device driver 108 may take the plurality of points corresponding to a touch area 504, 508 and calculate an intended selection point on the touch screen 104. For example, the device driver 108 may calculate the intended location based on a point maximum or minimum electrical field intensity. Alternatively, or in combination, the device driver may compute a geometric center of the touch area 504, 508. In FIG. 5, the first touch area 504 includes a first touch area center 512. The second touch area 508 includes a second touch area center 516. As used herein, a "touch area center" corresponds to the point on the touch screen 104 that the device driver 108 calculates the user intended to select when the user touched the touch screen 104. In FIG. 5, a touch screen operation is illustrated that includes the user touching the touch screen 104 substantially at the center of the key 208 and sliding his or her thumb or finger along the slide path 520 to the second touch area 508.

In accordance with implementations discussed herein, a selection of a particular secondary key character may be indicated by the second touch area being near or substantially near a particular menu character 228. In this regard, the device driver 108 may plot a menu character region 524. FIG. 5 includes a number of menu character regions 524 centered on or otherwise oriented with respect to the individual menu characters 228. A selection of a particular menu character 228 may be indicated by the second touch area center 516 falling or otherwise being located within a particular menu character region 524. As shown in FIG. 5, the second touch area center 516 falls or is otherwise located within the menu character region 524 associated with the "C" character. Accordingly, the user touch screen 108 operation illustrated in FIG. 5 selects the "C" character.

In addition to plotting a menu character region 524, the device driver 108 may plot a larger slide region 528 that defines an area on the touch screen operable to register a touch screen slide. The slide region 528 may be centered on or otherwise plotted in reference to the first touch area center 512. In accordance with implementations discussed herein, the character menu 224 may be displayed in an upper portion of the slide region 528. As shown in FIG. 5, the slide region 528 is substantially centered on or otherwise oriented with respect to the key 208 selected by the user. By way of example and not limitation, the first touch area shown in FIG. 5 substantially corresponds to the center of the key 208. However this will not necessarily always be the case. In some instances, a user may select a particular key 208 by pressing the key 208 at an off-center location.

Figure 6:
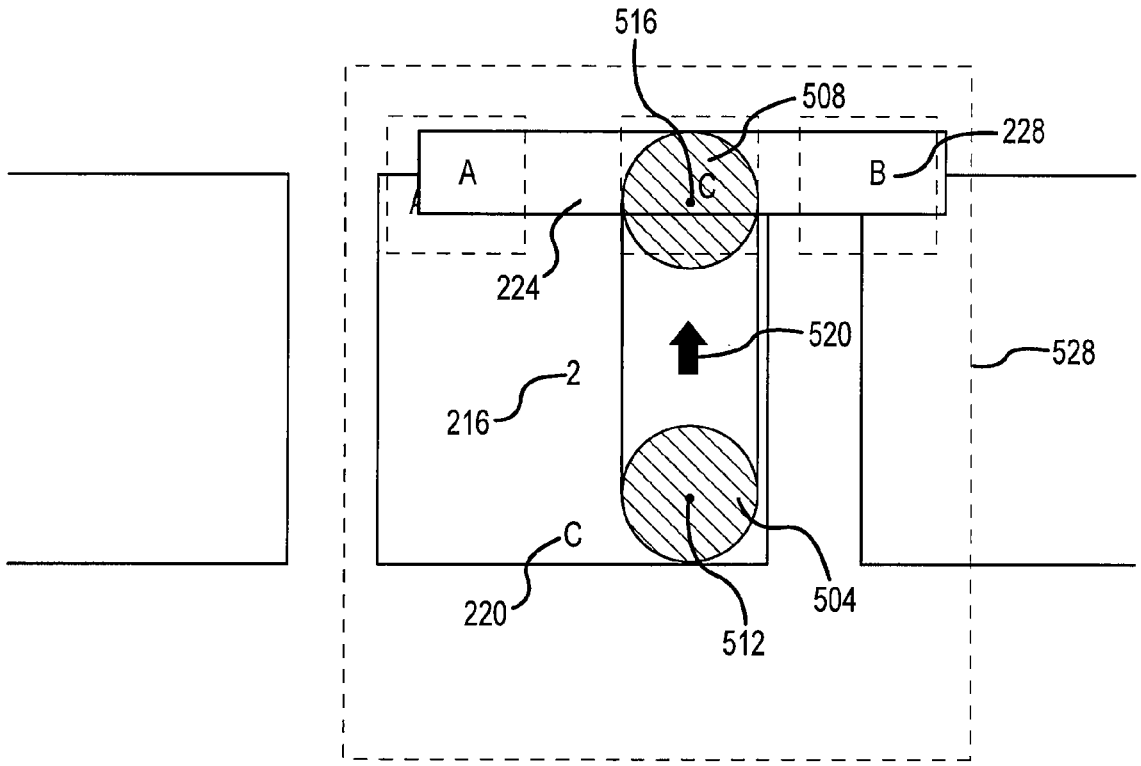
FIG. 6 is an illustration of a portion of the touch screen display shown in FIG. 2A that shows another key touch screen operation.

FIG. 6 is an illustration of a user touch screen operation that includes a first touch area 504 which is located in an off-center area of the key 208. Like the touch screen operation shown in FIG. 5, the touch screen operation shown in FIG. 6 includes a selection of the "C" character. In the touch screen operation illustrated in FIG. 6, the user initially presses the key 208 as indicated by the first touch area 504. Based on the location of the first touch area center 512, the first touch area 504 may be calculated to be within the boundaries of the key 208. Following this, the device driver 108 may register the first touch area 504 as a user selection of the key 208. Following this first touch screen 104 input, the user may slide his or her thumb or finger from the first touch area 504 to the second touch area 508. Based on the location of the second touch area center 516, the device driver 108 may determine that the second touch area 508 is located within the menu character region 524. In the example shown in FIG. 6, the device driver 108 may calculate that the second touch area 508 corresponds to the "C" character. Accordingly, the device driver 108 may register the touch screen 104 operation as a selection of the "C" character. In FIG. 6, the slide region 528 is not centered on the selected key 208 due to the fact that the user did not press the key 208 at the center of the key 208. The character menu 224 may be displayed in relation to the first touch area 504 or first touch area center 512. Here, the character menu 224 may be located in a position that overlaps the key 208 and/or an adjacent key 208. Regardless of the positioning of the slide region 528 and the character menu 224 the operation of the touch screen 104 may be the same.

Figure 7:
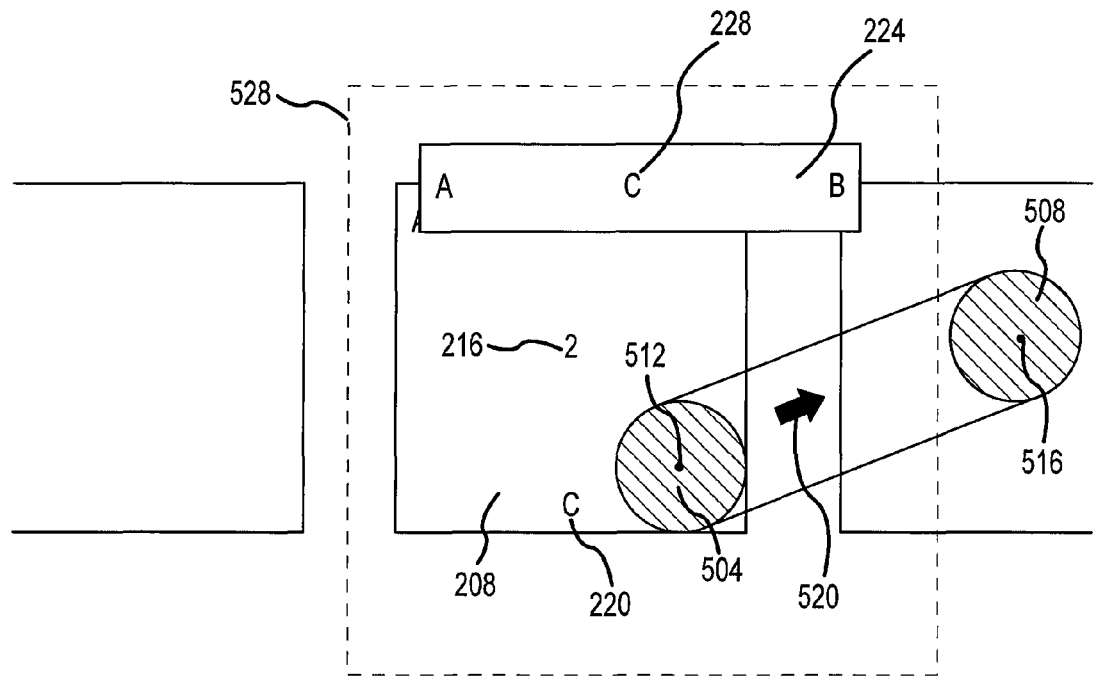
FIG. 7 is an illustration of a portion of the touch screen display shown in FIG. 2A that shows another key touch screen operation.

In accordance with implementations discussed herein, the device driver 108 may plot a slide region 528 that defines an operable range for slide movements associated with character selection. In particular, if a second touch area 508 occurs outside of the slide region, the device driver 108 may register that the user touch screen operations, which include first and second touch screen inputs, do not indicate a selection of a menu character 224. This operation is illustrated in FIG. 7. In FIG. 7, a first touch area 504 occurs at an off-center location of the key 208, by way of example and not limitation. A slide region 528 is thereby plotted with respect to the first touch area center 512 and a character menu 224 is displayed in the upper area of the slide region 528. Following this, a user slides his or her thumb or finger along a glide path to a second touch area 508. The second touch area center 516 is calculated to be located at a point that is outside of the slide region 528. Accordingly, the device driver 108 registers this set of user operations as not indicating a selection of a menu character 228. In some embodiments, this set of user touch screen inputs may be interpreted by the device driver 108 as a selection of the primary key character 216. With respect to the example shown in FIG. 7, the device driver 108 may, in this embodiment, return the value of "2". In other embodiments, this set of user touch screen 104 inputs may be interpreted as a mistake, and in this instance the device driver 108 may not return a character or may return a null character indicating a non-selection.

Figure 8:
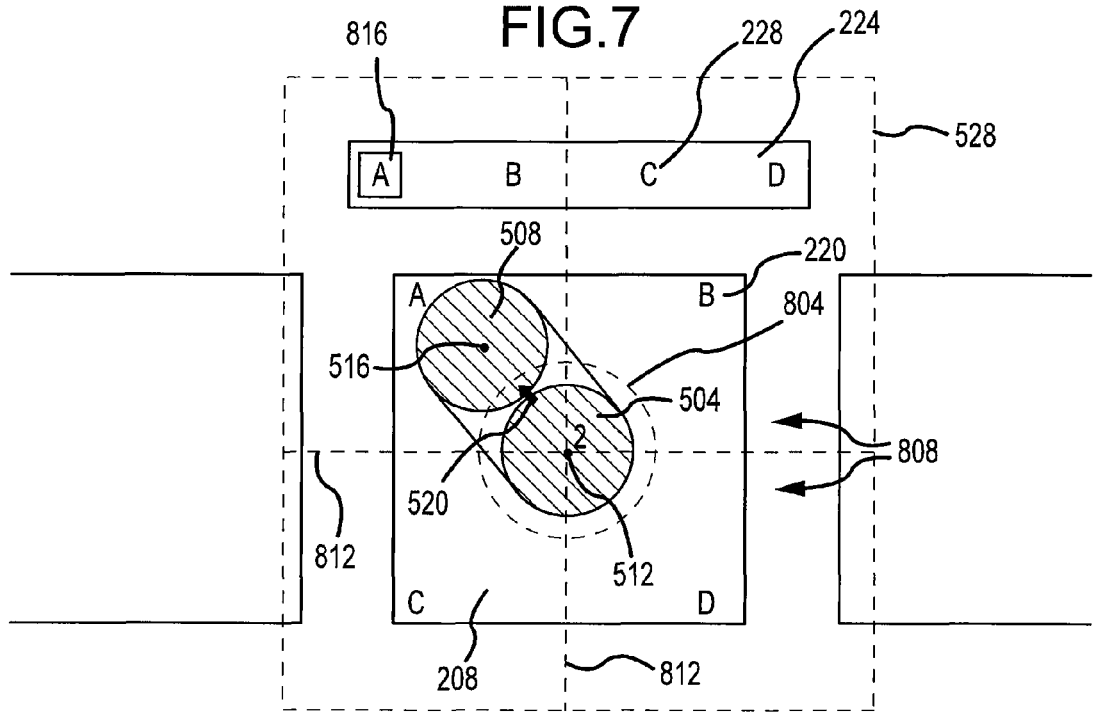
FIG. 8 is an illustration of a portion of the touch screen display shown in FIG. 2A that shows another key touch screen operation.

As shown in FIG. 8, the device driver 108 may plot a first touch area region 804 that is centered or otherwise oriented with respect to the first touch area center 512. The first touch area region 804 may be used to account for slight movements of the user's thumb or finger when it is pressed and held against the touch screen 104. Specifically, the device driver 108 may define or interpret small or nominal movements about the first touch area center 512 as not corresponding to any intentional movement or selection by a user. Accordingly, if any subsequent touch areas have a touch area center that is within the first touch area region 804, the device driver 108 may interpret this subsequent user input as not corresponding to a deliberate or intentional movement of the user's thumb or finger.

As described in connection with FIG. 5 and FIG. 6, a user selection of a menu character 228 may be indicated by the second touch area center 516 being located at or being in close proximity to a particular menu character 228. In accordance with other embodiments, the direction of movement between the first touch area 504 and second touch area 508 may indicate a selection of a particular menu character 228. In this regard, the slide region 528 may be divided into a number of slide region sectors 808, which are separated by slide region boundaries 812. By way of example and not limitation, FIG. 8 includes a key 208 having four secondary key characters 220 and accordingly four menu characters 228. In FIG. 8, the slide region 528 is divided into four slide region sectors 808. The touch screen operation illustrated in FIG. 8 results in a selection of the "A" character. Specifically, the user touch screen 104 operation begins with a first touch 104 screen input corresponding to a first touch screen area 504. In response to this first touch screen 104 input, the device driver 108 may calculate a slide region 528 having a number of slide region sectors 808. The slide region 528 may be plotted based on or in reference to a first touch area center 512. Following this, the device driver 108 may plot a number of slide region boundaries 812 intersecting at the first touch area center 512. The slide region boundaries 812 may define a number of slide region sectors 808. As shown in FIG. 8, the user may move his or her thumb or finger along the slide path 520 from the first touch area 504 to a second touch area 508. The device driver 108 may calculate a second touch area center 516, and determine that the second touch area center 516 is located in a particular slide region sector 808. In the example shown in FIG. 8, in which the second touch area 508 is located in the sector associated with the "A" character. The selection of the "A" character may be graphically indicated by a menu character highlight 816, as shown in FIG. 8. The highlight 816 may include a shading, a color, a cross-hatching or any other graphical indicator used to cause the selected or highlighted character to stand out in relation to other menu characters 228 associated with the character menu 224. In accordance with implementations discussed herein, the operable portions of the slide region sector 808 may be defined to not include the first touch area region 804 specifically, the device driver 108 may not register the slide 520 or second touch area 508 to be within a particular slide region sector 808 if the center of the second touch area 516 falls inside of the first touch area region 804.

Figure 9:
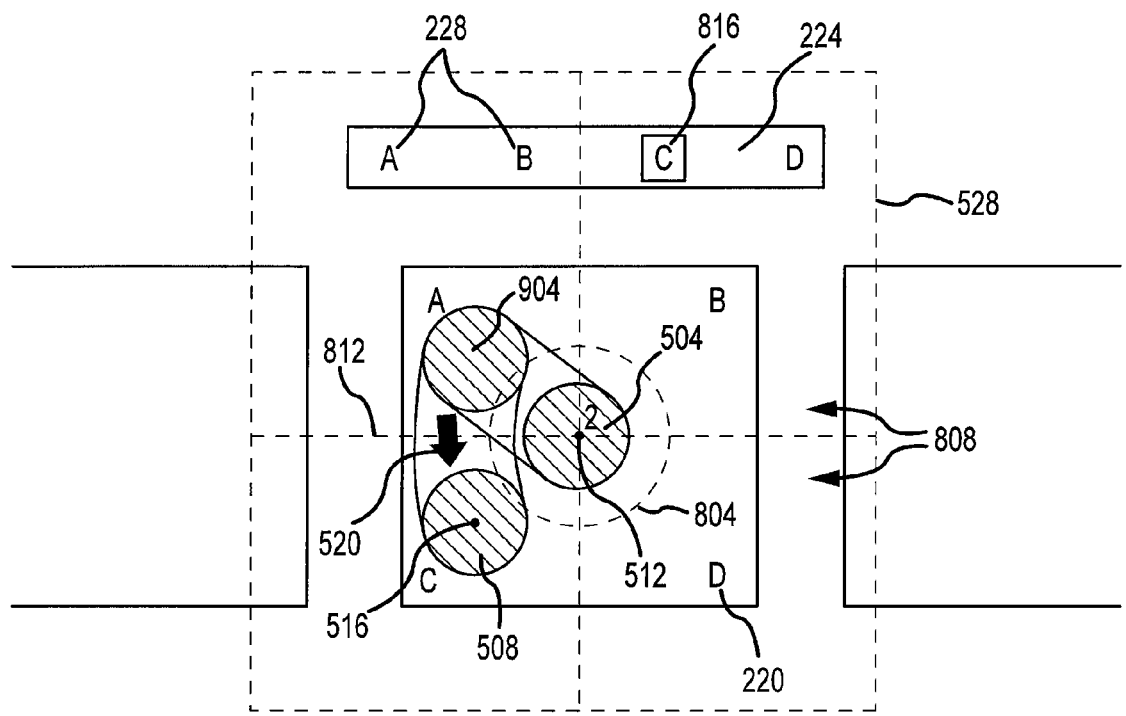
FIG. 9 is an illustration of a portion of the touch screen display shown in FIG. 2A that shows another key touch screen operation.
Figure 10:
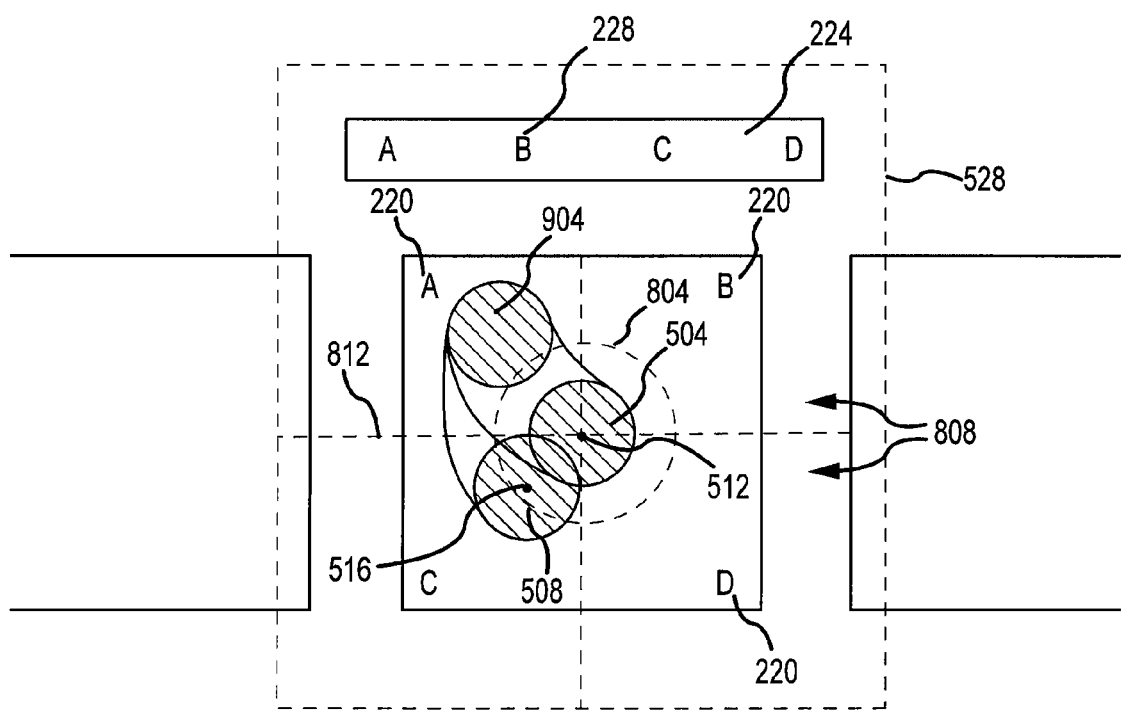
FIG. 10 is an illustration of a portion of the touch screen display shown in FIG. 2A that shows another key touch screen operation.

In selecting a particular secondary key character 216, the user may move his or her thumb or finger through various slide region sectors 808 that are defined by or otherwise oriented with respect to the first touch area center 512. With reference to FIG. 9, the touch screen 104 operation shown therein results in a selection of the "C" character. In the operation shown in FIG. 9, a user initially moves or slides his or her thumb or finger from the initial location to the slide region sector 808 associated with the "A" character. Following this, the user slides his or her thumb or finger from the slide region sector 808 associated with the "A" character to the slide region sector associated with the "C" character. Following this movement, the "C" character is indicated by a highlight 816 or other emphasis in the character menu 224, as shown in FIG. 9. Accordingly, the user may indicate a character selection by removing or otherwise lifting his thumb or finger away from the touch screen 104 after moving his thumb or finger through one or more intermediate positions in various slide region sectors 808. Here, the final destination or location on the touch screen 104 may be indicate a character selection. It may be the case that the user, after a series of sliding operations moves his thumb or finger back within the first touch area region 804. This case is illustrated in FIG. 10. In moving his or her thumb or finger in this way the user may indicate a selection of the primary key character 216.

Figure 11:
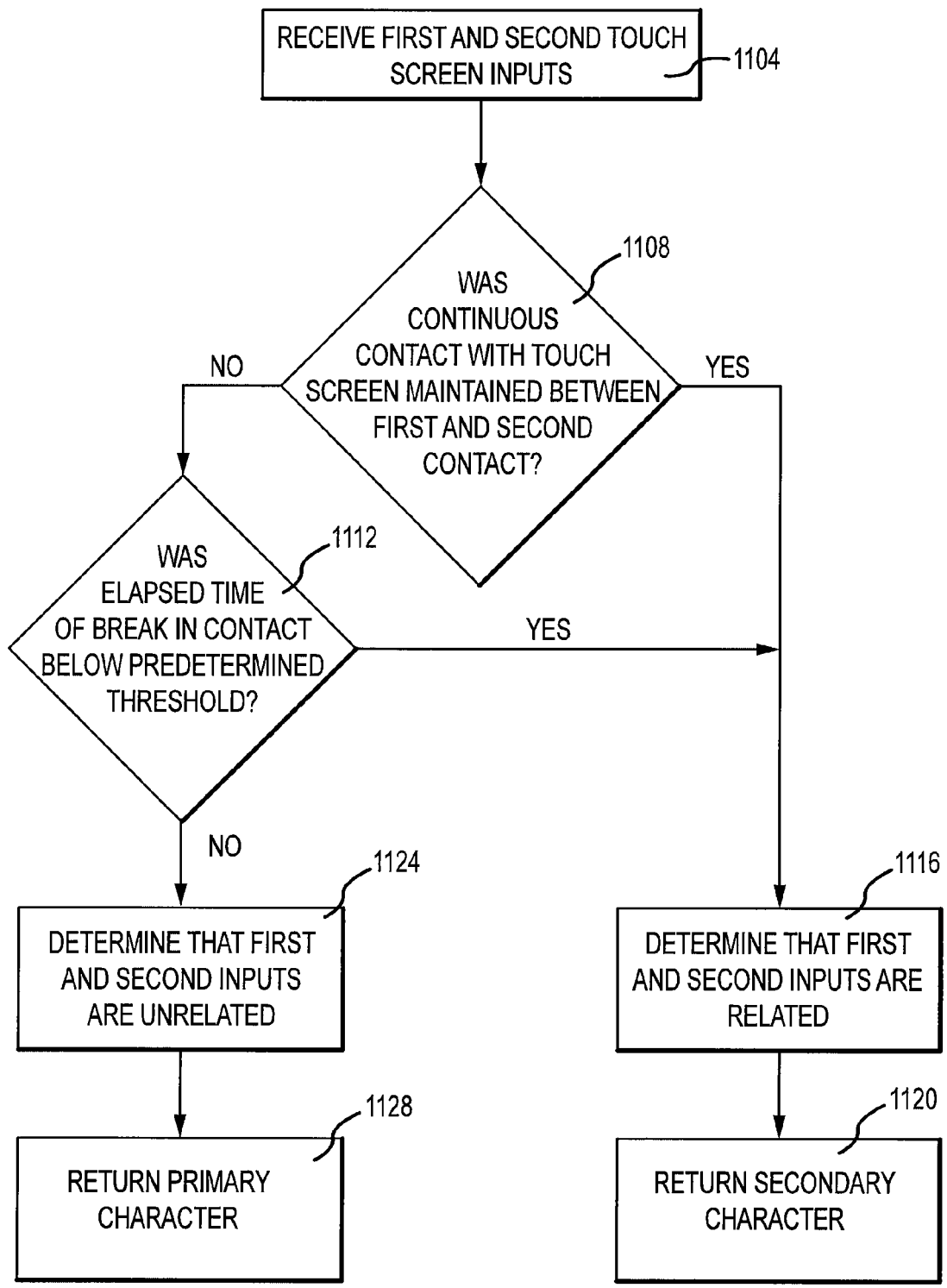
FIG. 11 is a flow chart illustrating a method in accordance with implementations discussed herein.
Figure 12:
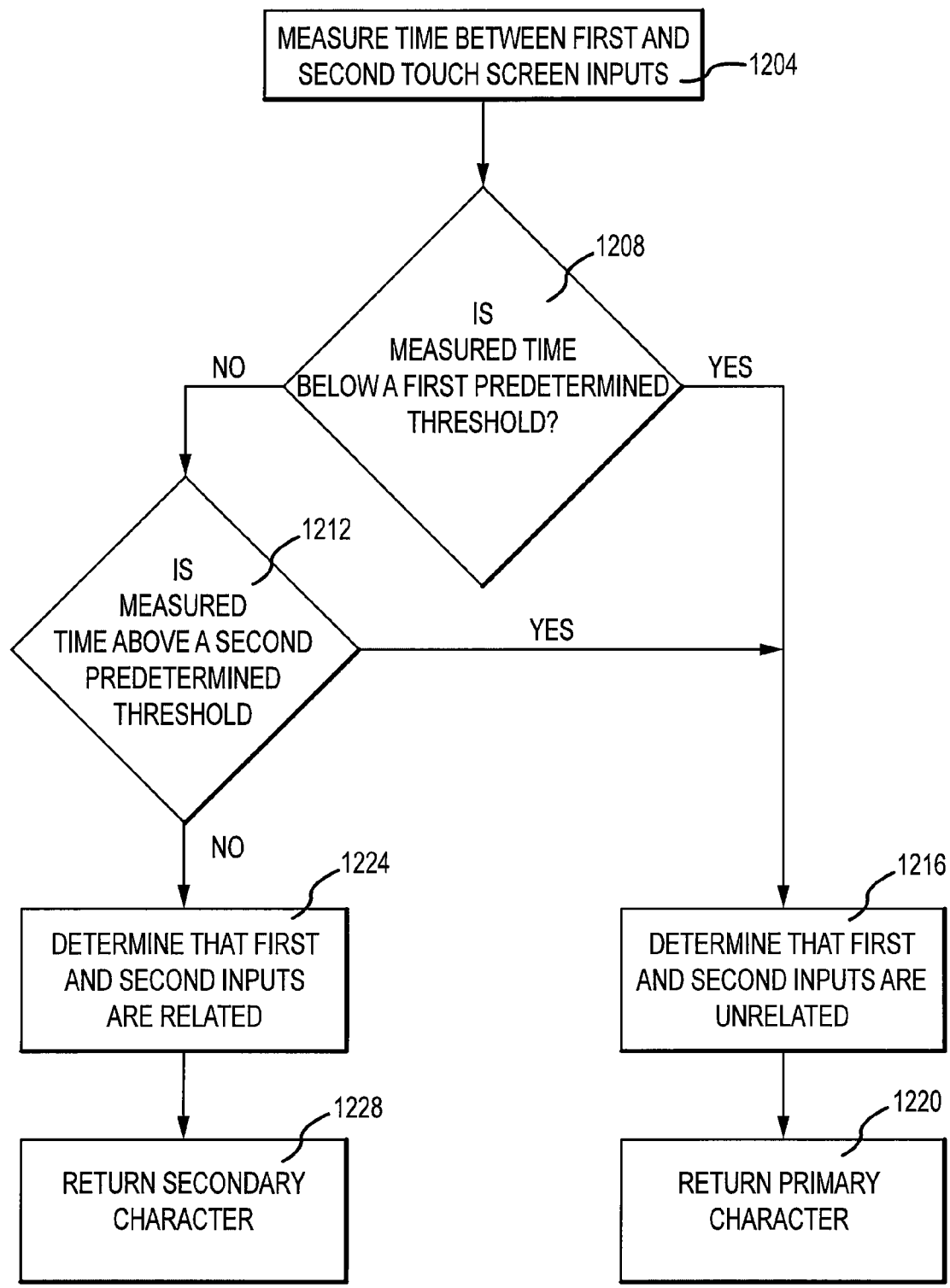
FIG. 12 is another flow chart illustrating another method in accordance with implementations discussed herein.

In accordance with implementations discussed herein, a user may select a particular secondary key character 220 by a touch screen operation that includes at least two related touch screen inputs. In determining that the user intended to select a particular secondary key character 220, the device driver 108 may determine that a first and second touch screen input are related. In so doing, the device driver 108 may determine that the user placed his thumb or finger in contact with the touch screen 104 and, following this, slid his thumb or finger across the screen 104 to a second location. FIG. 11 and FIG. 12 are flow charts that illustrate methods in accordance with implementations discussed herein that determine that a relationship is indicated between the first and second touch screen inputs.

FIG. 11 is a method in accordance with implementations discussed herein. Initially, at step 1104, the device driver 108 receives first and second touch screen 104 inputs. Following operation 1104, operation 1108 may be executed. At operation 1108, a determination is made as to whether continuous contact with the touch screen 104 was maintained between the first and second touch screen 104 inputs. If continuous contact was maintained, operation 1116 may be executed following operation 1108. At operation 1116, the device driver 108 determines that the first and second inputs are related. Operation 1120 may be executed following operation 1116. At operation 1120, the device driver 108 may return a particular secondary key character 220 that is indicated by the user through the first and second touch screen inputs.

If continuous contact was not maintained with the touch screen 104 between the first and second inputs, operation 1112 may be executed following operation 1108. At operation 1112, a determination is made if an elapsed time of the break in continuous contact with the touch screen 104 was below a predetermined threshold. If the time of the break in contact is below the predetermined threshold, operation 1116 may be executed following operation 1112. At operation 1116, the device driver 108 determines that the first and second inputs are related and, following this, the device driver 108 returns an secondary key character 220 in operation 1120. If at operation 1112, it is determined that the elapsed time of the break in contact was not below the predetermined threshold, operation 1124 may be executed following operation 1112. In operation 1124, the device driver 108 determines that the first and second inputs are unrelated. Following operation 1124, operation 1128 may be executed. In operation 1128, the device driver may return the primary key character 216.

As an alternative to or in combination with determining an amount of continuous contact with the touch screen, the device driver 108 may determine a speed or other rate of change associated with touch screen input. A touch screen slide that is either greater than or less than a particular speed the device driver 108 may determine that the slide operation is not indicative of a user's selection of a particular secondary key character 220. This operation is described in detail in connection with FIG. 12.

Initially, at operation 1204, the device driver 108 measures the time between first and second touch screen inputs. Following operation 1204, operation 1208 may be executed. In operation 1208, a determination is made as to whether the time measured in operation 1204 is below a first predetermined threshold. If, at operation 1208, it is determined that the time is below the first predetermined threshold, operation 1216 may be executed. In operation 1216, the device driver 108 determines that the first and second touch screen inputs are not related. Following operation 1216, operation 1220 may be executed. In operation 1220, the device driver may return the primary key character 216. If in operation 1208, it is determined that the measured time is now below the first predetermined threshold, operation 1212 may be executed. In operation 1212, a determination is made if the time measured in operation 1204 is above a second predetermined threshold. If in operation 1212, it is determined that the time is above the second predetermined threshold, operation 1216 may be executed. In operation 1216, the device driver 108 determines that the first and second inputs are unrelated and following this the device driver 108 may return the primary key character 216 in operation 1220. If in operation 1212 it is determined that the measured time is not above the second predetermined threshold, operation 1224 may be executed. In operation 1224, the device driver 108 may determine that the first and second inputs are related. Following operation 1224, operation 1228 may be executed. In operation 1228, the device driver 108 may determine the secondary key character 220.

The foregoing merely illustrates certain principles of certain implementations. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

The invention claimed is:

1. In an electronic device having a touch screen and a device driver controlling the touch screen, the device driver running on a processor, a method for receiving user input, comprising:
    displaying on the touch screen a virtual keyboard with a number of virtual keys, each virtual key having a respective primary key character of a plurality of primary key characters and a respective plurality of secondary key characters of a plurality of secondary key characters different from the plurality of primary key characters, the number of virtual keys corresponding to a number of primary key characters and being less than a total number of primary key characters and secondary key characters wherein the primary key characters and the secondary key characters are selectable for display in an output window;
    receiving, through the touch screen, a first touch screen input at a first touch position, the first touch position corresponding to a first virtual key, the first virtual key having a first primary key character and a plurality of first secondary key characters indirectly selectable through the first touch screen input received at the first touch position;
    displaying, by the device driver, in response to the first touch screen input received at the first touch position, a character menu on the touch screen, the character menu having a plurality of menu characters including the plurality of first secondary key characters of the first virtual key, each of the plurality of menu characters being associated with a respective second touch position and being directly selectable through a second touch screen input received at one of the respective second touch positions;
    receiving, through the touch screen, the second touch screen input related to the first touch screen input at one of the respective second touch positions;
    displaying, by the device driver, in the output window on the touch screen a particular one of the plurality of menu characters corresponding to the second touch screen input received at one of the respective second touch positions;
    plotting, by the device driver, a menu character region on the touch screen, the menu character region oriented with respect to a first menu character; and
    determining, by the device driver, that one of the respective second touch positions on the touch screen is located within the menu character region;
    wherein the operation of displaying the particular one of the plurality of menu characters includes displaying one of the plurality of first secondary key characters corresponding to the particular one of the plurality of menu characters enclosed by the menu character region.

2. The method of claim 1, further comprising:
    plotting, by the device driver, a slide region based on the first touch position on the touch screen, wherein the slide region defines an area on the touch screen in which one of the respective second touch positions must be located in order for the first touch screen input to be related to the second touch screen input;
    wherein the operation of displaying the character menu includes displaying the character menu in an upper area of the slide region.

3. The method of claim 1, further comprising:
    plotting, by the device driver, a slide region based on the first touch position on the touch screen, wherein the slide region defines an area on the touch screen in which one of the respective second touch positions must be located in order for the first touch screen input to be related to the second touch screen input;
    determining, by the device driver, that one of the respective second touch positions is located outside of the slide region; and
    wherein the step of displaying the particular one of the plurality of menu characters includes displaying the first primary key character of the first virtual key.

4. The method of claim 1, further comprising:
    plotting, by the device driver, a first touch position region on the touch screen, the first touch position region enclosing at least the first touch position; and
    determining, by the device driver, if one of the respective second touch positions is located within the first touch position region;
    wherein the operation of displaying a particular one of the plurality of menu characters includes displaying the first primary key character if one of the respective second touch positions is located within the first touch position region;
    wherein the operation of displaying a particular one of the plurality of menu characters includes displaying one of the plurality of first secondary key characters if one of the respective second touch positions is not located within the first touch position region.

5. The method of claim 1, further comprising:
    plotting, by the device driver, a first touch position region on the touch screen, the first touch position region enclosing at least the first touch position; and
    receiving, through the touch screen, an intermediate touch screen input occurring between the first touch screen input and the second touch screen input, the intermediate touch screen input corresponding to an intermediate touch screen position located outside of the first touch position region; and
    determining that one of the respective second touch positions is located within the first touch position region;
    wherein the operation of displaying the particular one of the plurality menu characters includes displaying the first primary key character.

6. The method of claim 1, further comprising:
    plotting, by the device driver, a plurality of slide region sectors on the touch screen, the slide region sectors being separated by a plurality of slide region sector boundaries, the slide region sector boundaries intersecting at the first touch position;
    associating, by the device driver, a first slide region sector with a first secondary key character of the plurality of first secondary key characters of the first virtual key; and
    determining, by the device driver, that one of the respective second touch position is within the first slide region sector;
    wherein the operation of displaying the particular one of the plurality menu characters includes displaying the first secondary key character.

7. The method of claim 1, further comprising:
determining, by the device driver, that a continuous contact with the touch screen was maintained between the first touch screen input and the second touch screen input; and
in response to determining that the continuous contact was maintained with the touch screen, determining that the first touch screen input is related to the second touch screen input;
wherein the operation of displaying the particular one of the plurality menu characters includes displaying one of the plurality of first secondary key characters.

8. The method of claim 1, further comprising:
determining, by the device driver, that a duration of a break in a continuous contact with the touch screen between the first touch screen input and the second touch screen input was below a predetermined threshold; and
in response to determining that the duration of the break was below the predetermined threshold, determining, by the device driver, that the first touch screen input is related to the second touch screen input;
wherein the operation of displaying the particular one of the plurality menu characters includes displaying one of the plurality of first secondary key characters.

9. The method of claim 1, further comprising:
determining, by the device driver, that a duration of a break in a continuous contact with the touch screen between the first touch screen input and the second touch screen input was above a predetermined threshold; and
in response to determining that the duration of the break was above the predetermined threshold, determining, by the device driver, that the first touch screen input is not related to the second touch screen input;
wherein the operation of displaying the particular one of the plurality menu characters includes displaying the first primary key character.

10. The method of claim 1, further comprising:
determining, by the device driver, that an elapsed time between the first touch screen input and the second touch screen input is greater than a determined threshold;
in response to determining that the elapsed time is greater than the determined threshold, determining, by the device driver, that the first touch screen input is not related to the second touch screen input;
wherein the operation of displaying the particular one of the plurality menu character includes displaying the first primary key character.

11. The method of claim 1, further comprising:
determining, by the device driver, that an elapsed time between the first touch screen input and the second touch screen input is less than a determined threshold;
in response to determining that the elapsed time is less than the determined threshold, determining, by the device driver, that the first touch screen input is related to the second touch screen input;
wherein the operation of displaying the particular one of the plurality menu characters includes displaying one of the plurality of secondary key characters.

12. An electronic device, comprising:
a processor in communication with at least one memory for storing computer executable code;
a device driver stored in the memory and executing on the processor; and
a touch screen under control of the device driver, the touch screen operable to:
display a virtual keyboard with a number of virtual keys, each virtual key having a respective primary key character of a plurality of primary key characters and a respective plurality of secondary key character of a plurality of secondary key characters different from the plurality of primary key characters, the number of virtual keys corresponding to a number of primary key characters and being less than a total number of primary key characters and secondary key characters;
receive a first touch screen input corresponding at a first touch screen location, the first touch screen location corresponding to a first virtual key, the first virtual key having a first primary key character and a plurality of first secondary key characters indirectly selectable through the first touch screen input received at the first touch screen location;
display a character menu in response to the first touch screen input received at the first touch screen location, the character menu having a plurality of menu characters including the plurality of first secondary key characters of the first virtual key, each of the plurality of menu characters being associated with a respective second touch screen location and being directly selectable though a second touch screen input received at one of the respective second touch screen locations;
display in an output window a particular one of the plurality of menu characters corresponding to the second touch screen input received at one of the respective second touch screen locations; and
wherein the plurality of primary key characters are numbers and the plurality of secondary key characters include letters.

13. The electronic device of claim 12 wherein the number of virtual keys are arranged in a line and the plurality of primary key characters and the plurality of secondary key characters of the number of virtual keys are arranged to form a QWERTY keyboard.

14. The electronic device of claim 12, further comprising:
a menu character region on the touch screen, the menu character region enclosing at least a first menu character of the plurality of menu characters;
wherein if one of the respective second touch screen location on the touch screen is located within the menu character region, the output window displays one of the plurality of first secondary key characters corresponding to the particular one of the plurality of menu characters enclosed by the menu character region.

15. The electronic device of claim 12, further comprising:
a slide region oriented with respect to the first touch screen location on the touch screen, wherein the slide region defines an area on the touch screen in which one of the respective second touch screen locations must be located in order for the first touch screen input to be related to the second touch screen input;
wherein the character menu is displayed in an upper area of the slide region.

16. The electronic device of claim 12, further comprising:
a first touch position region on the touch screen enclosing at least the first touch screen location;
wherein the output window displays the first primary key character if one of the respective second touch screen locations is located within the first touch position region;
wherein the output window displays one of the plurality of first secondary key characters if one of the respective second touch screen locations is not located within the first touch position region.

17. The electronic device of claim 12, further comprising:
a slide region oriented with respect to the first touch screen location on the touch screen, wherein the slide region defines an area on the touch screen in which one of the respective second touch screen locations must be located in order for the first touch screen input to be related to the second touch screen input;

wherein the output window displays the first primary key character of the first virtual key when one the respective second touch screen locations is located outside of the slide region.

18. The electronic device of claim 12, further comprising;

a plurality of slide region sectors on the touch screen, the slide region sectors being separated by a plurality of slide region sector boundaries, the slide region sector boundaries intersecting at the first touch screen location;

wherein a first slide region sector is associated with a first secondary key character of the plurality of first secondary key characters of the first virtual key, the first secondary key character associated with the respective second touch screen location;

wherein the output window displays the first secondary key character, when the respective second touch screen location is within the first slide region sector.

\* \* \* \* \*